(12) United States Patent
Matsuzawa

(10) Patent No.: US 10,930,311 B2
(45) Date of Patent: Feb. 23, 2021

(54) DUAL STATE ACTUATORS CONTROLLING FOR MAGNETIC RECORDING DEVICE

(71) Applicants: Kabushiki Kaisha Toshiba, Tokyo (JP); Toshiba Electronic Devices & Storage Corporation, Tokyo (JP)

(72) Inventor: Takuji Matsuzawa, Kashiwa Chiba (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/752,890

(22) Filed: Jan. 27, 2020

(65) Prior Publication Data
US 2020/0395043 A1 Dec. 17, 2020

(30) Foreign Application Priority Data
Jun. 13, 2019 (JP) .................... 2019-110485

(51) Int. Cl.
*G11B 5/55* (2006.01)
*G11B 5/48* (2006.01)

(52) U.S. Cl.
CPC .......... *G11B 5/5578* (2013.01); *G11B 5/4873* (2013.01); *G11B 5/553* (2013.01); *G11B 5/5526* (2013.01); *G11B 5/5547* (2013.01); *G11B 5/5552* (2013.01); *G11B 5/5556* (2013.01); *G11B 5/5582* (2013.01)

(58) Field of Classification Search
None
See application file for complete search history.

(56) References Cited

U.S. PATENT DOCUMENTS

| | | | | | |
|---|---|---|---|---|---|
| 5,404,255 | A | * | 4/1995 | Kobayashi | G11B 5/5534 360/77.04 |
| 5,714,831 | A | * | 2/1998 | Walker | H02N 2/062 310/316.01 |
| 6,088,187 | A | * | 7/2000 | Takaishi | G11B 5/5552 360/78.05 |
| 6,674,605 | B1 | * | 1/2004 | Ell | G11B 5/5552 360/78.05 |
| 7,283,321 | B1 | * | 10/2007 | Sun | G11B 5/5552 360/78.05 |

(Continued)

FOREIGN PATENT DOCUMENTS

JP 3710641 B2 10/2005

*Primary Examiner* — Tan X Dinh
(74) *Attorney, Agent, or Firm* — White & Case LLP

(57) ABSTRACT

According to one embodiment, a magnetic disk device includes a first actuator which actuates a magnetic head portion including a magnetic head, a second actuator which adjusts a position of the magnetic head on a magnetic disk in a radial direction of the magnetic disk, and a control portion which determines a second measurement signal amplitude when a second transfer function is measured in accordance with a first gain estimated value of the second actuator and an amplitude of a first measurement signal amplitude to the second actuator applied when a first transfer function is measured, which calculates a second gain estimated value of the second actuator based on the first transfer function and the second transfer function, and which updates the first gain estimated value, using the calculated second gain estimated value.

7 Claims, 4 Drawing Sheets

(56) References Cited

U.S. PATENT DOCUMENTS

| | | | |
|---|---|---|---|
| 7,538,971 B2* | 5/2009 | Sun | G11B 5/5552 |
| | | | 360/77.02 |
| 7,869,157 B2* | 1/2011 | Nagashima | G11B 5/596 |
| | | | 360/77.04 |
| 8,611,040 B1 | 12/2013 | Xi et al. | |
| 8,780,489 B1 | 7/2014 | Gayaka et al. | |
| 9,142,235 B1 | 9/2015 | Babinski et al. | |
| 9,928,862 B1* | 3/2018 | Park | G11B 5/59694 |
| 2002/0176201 A1* | 11/2002 | Hsin | G11B 5/5552 |
| | | | 360/78.05 |
| 2004/0004781 A1* | 1/2004 | Kobayashi | G11B 5/4806 |
| | | | 360/69 |
| 2013/0258520 A1* | 10/2013 | Matsuzawa | G11B 5/5552 |
| | | | 360/75 |

* cited by examiner

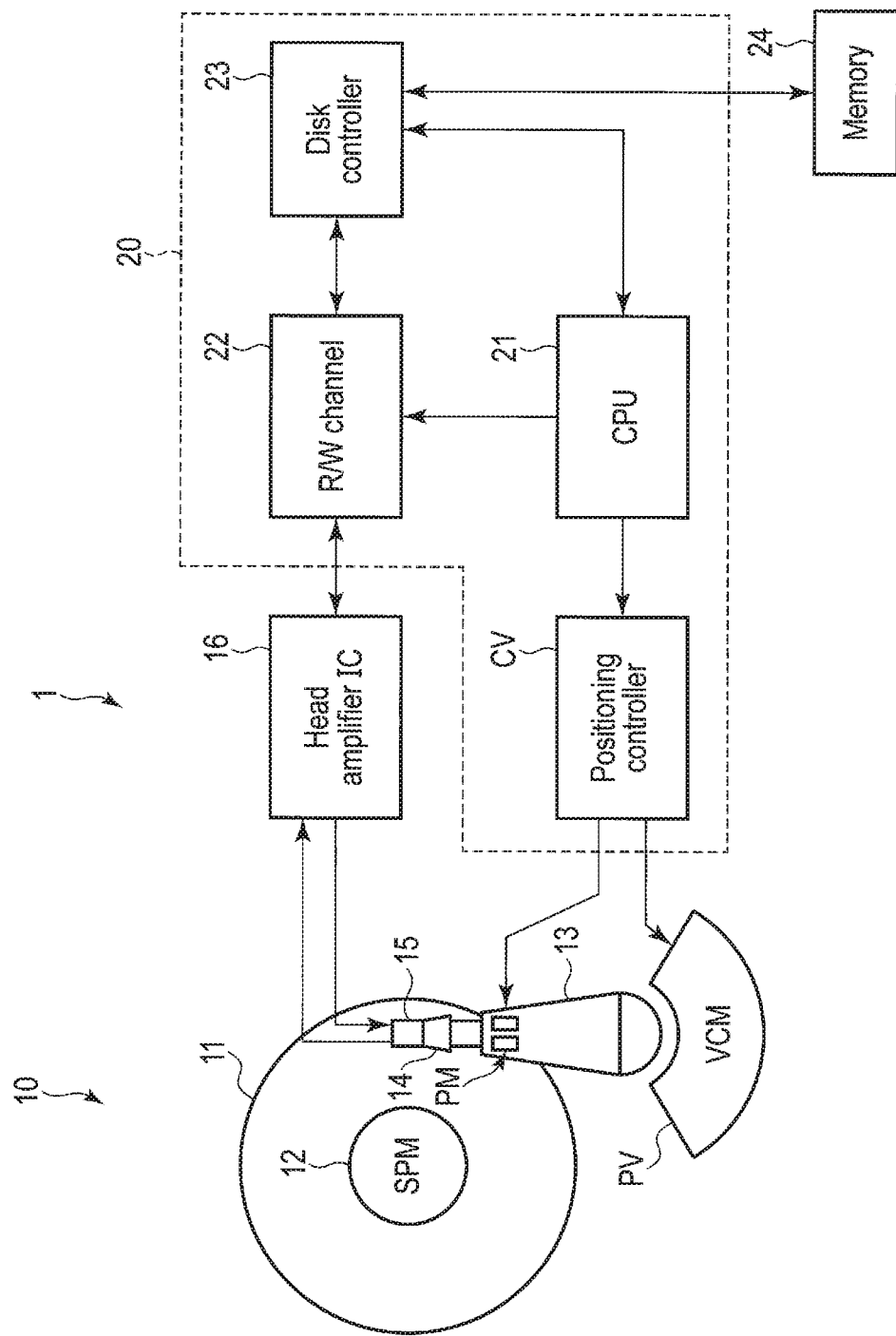
F I G. 1

| Time and date | Position A | Position B | ... | Position N |
|---|---|---|---|---|
| 20YY/Y/Y YY:YY:YY | X11 | X12 | ... | X1N |
| 20YY/X/X XX:XX:XX | X21 | X22 | ... | X2N |
| | | | | |

F I G. 5

US 10,930,311 B2

DUAL STATE ACTUATORS CONTROLLING FOR MAGNETIC RECORDING DEVICE

CROSS-REFERENCE TO RELATED APPLICATIONS

This application is based upon and claims the benefit of priority from Japanese Patent Application No. 2019-110485, filed Jun. 13, 2019, the entire contents of which are incorporated herein by reference.

FIELD

Embodiments described herein relate generally to a magnetic disk device.

BACKGROUND

Magnetic disk devices in which magnetic heads are equipped with microactuators which are slightly actuated in radial directions of magnetic disks have been known. By slightly actuating the microactuators at the time of read/write, and the magnetic heads can be precisely positioned with respect to the magnetic disks. In such magnetic disk devices equipped with microactuators, gains (input/output ratios) of the microactuators need to be ascertained for each magnetic head in order to execute positioning control of the magnetic heads.

However, the magnetic disk devices are generally not equipped with sensors which measure displacements of the microactuators. Thus, a method of estimating the gains of the microactuators by dividing gains of measured first transfer functions by gains of measured second transfer functions may be adopted in order to estimate the gains of the microactuators.

Incidentally, in the magnetic disk devices, the gains of the transfer functions may vary according to excitation amplitudes at the time when the transfer functions are measured. If the gains vary in this manner, errors may be made in estimating the gains of the microactuators.

An object of the embodiments described herein is to provide a magnetic disk device capable of precisely obtaining a gain of a microactuator.

BRIEF DESCRIPTION OF THE DRAWINGS

FIG. 1 is a block diagram showing an example of the structure of a magnetic disk device according to an embodiment.

FIG. 5 is a diagram showing an example of history information according to the embodiment.

DETAILED DESCRIPTION

Figure 2:
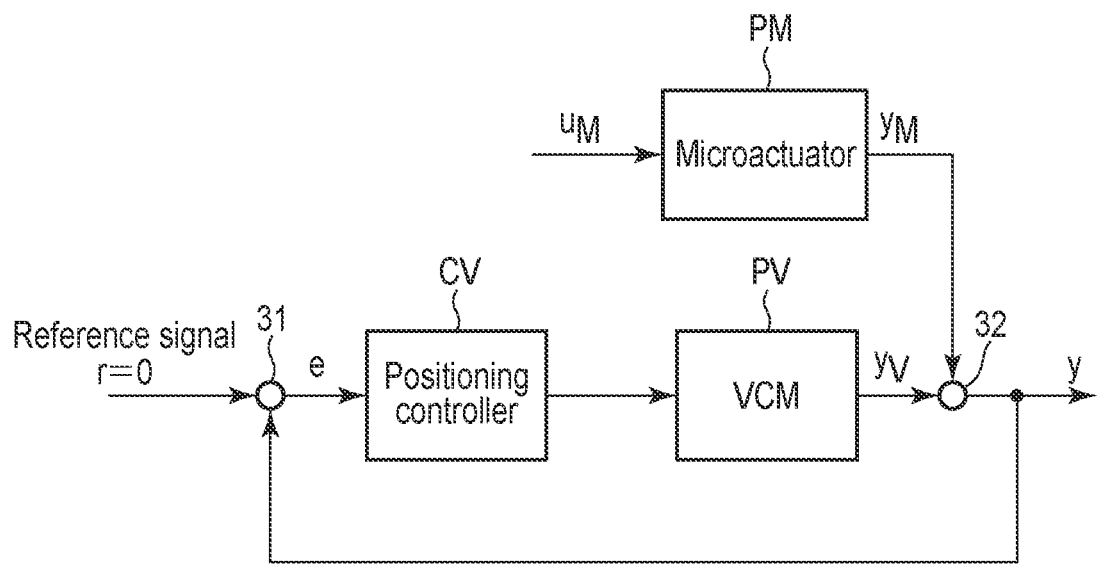
FIG. 2 is a diagram for explaining a measurement process of a first transfer function according to the embodiment.

In general, according to one embodiment, a magnetic disk device comprises: a first actuator which actuates a magnetic head portion including a magnetic head; a second actuator which adjusts a position of the magnetic head on a magnetic disk in a radial direction of the magnetic disk; and a control portion which determines a second measurement signal amplitude when a second transfer function is measured in accordance with a first gain estimated value of the second actuator and an amplitude of a first measurement signal amplitude to the second actuator applied when a first transfer function is measured, which calculates a second gain estimated value of the second actuator based on the first transfer function and the second transfer function, and which updates the first gain estimated value, using the calculated second gain estimated value.

Embodiments will be described hereinafter with reference to the accompanying drawings. The disclosure is merely an example, and the invention is not limited by the matters disclosed in the embodiments below. Modifications which are easily conceivable by a person having ordinary skill in the art are included in the scope of the disclosure as a matter of course. To make the description clearer, in the drawings, the size, the shape, etc., of each portion may be changed from those in the actual mode and be schematically shown. Corresponding elements in drawings may be given the same reference numbers, and a detailed description thereof may be omitted.

First Embodiment

FIG. 1 is a block diagram showing an example of the structure of a magnetic disk device 1 according to an embodiment.

The magnetic disk device 1 is composed of a head-disk assembly (HDA) 10, a head amplifier integrated circuit (hereinafter, referred to as a head amplifier IC) 16, and a system-on-chip (SOC) 20.

The HDA 10 comprises a magnetic disk 11, a spindle motor (SPM) 12, an arm 13, and a voice coil motor (VCM) PV, which is a first actuator. The magnetic disk 11 is rotated by the SPM 12. A load beam 14 is attached to the tip of the arm 13, and a magnetic head 15 is attached to the tip of the load beam 14. The arm 13 moves the magnetic head 15 to a specific position on the magnetic disk 11 by the driving of the VCM PV. Moreover, a pair of piezoelectric elements (for example, Pb[Zr,Ti]O3) PM are disposed in the vicinity of a portion where the load beam 14 is mounted of the tip of the arm 13. By applying a voltage to the pair of piezoelectric elements PM, the right and left piezoelectric elements PM expand and contract in antiphase to each other, and by displacing the magnetic head 15 at the tip of the load beam 14 in a radial direction (cross-track direction) on the magnetic disk 11, the position of the magnetic head 15 is adjusted in the radial direction of the magnetic disk 11 on the magnetic disk 11. In this manner, a dual-stage actuator in which the load beam driven by the piezoelectric elements, which are a second actuator, is added to the tip of the arm driven by the VCM, which is the first actuator, is realized. The piezoelectric elements PM will be hereinafter referred to as a microactuator (hereinafter, also merely referred to as "MA") PM.

The magnetic head 15 has the structure wherein a read head element and a write head element are mounted separately on one slider. The read head element reads data stored in the magnetic disk 11. The write head element writes data to the magnetic disk 11.

The head amplifier IC 16 comprises a read amplifier and a write driver. The read amplifier amplifies a read signal read by the read head element, and transmits the read signal to a read/write channel (R/W) channel 22. On the other hand, the write driver transmits a write current corresponding to write data output from the R/W channel 22 to the write head element.

The SOC 20 includes a microprocessor (CPU) 21, which is a control portion, the R/W channel 22, a disk controller 23, and a positioning controller CV. The CPU 21 is a main controller of a drive, and executes servo control for positioning the magnetic head 15 via the positioning controller CV and read/write control of data via the head amplifier IC 16. The R/W channel 22 includes a read channel which performs signal processing of read data and a write channel which performs signal processing of write data. The disk controller 23 executes interface control for controlling data transfer between a host system (not shown in the figures) and the R/W channel 22. It should be noted that the positioning controller CV may be realized as hardware or realized as software (firmware).

A memory 24 includes a volatile memory and a nonvolatile memory. For example, the memory 24 includes a buffer memory composed of a DRAM, and a flash memory. In the nonvolatile memory of the memory 24, a program necessary for the processing of the CPU 21, etc., and if a gain estimation process of the microactuator PM, which will be described later, is executed, its process result (history information, refer to FIG. 5) are stored. This process result can be output from the magnetic disk device 1 to the outside. Also, even if the process result is not stored in the memory 24, it suffices that the process result be stored in any storage area in the magnetic disk device 1.

Measurement processes of transfer functions will be next described with reference to FIG. 2 and FIG. 3.

FIG. 2 is a diagram for explaining a measurement process of a transfer function performed when the microactuator PM is actuated. In FIG. 2, y denotes a head position signal indicating the position of the magnetic head 15, yV denotes a VCM position signal indicating the position of the VCM PV, yM denotes a displacement of the microactuator PM, uM denotes a first measurement signal, e denotes a position error signal, and r denotes a reference signal. Here, the unit of the head position signal y, the VCM position signal yV, and the displacement yM of the microactuator is a track or a distance in a radial direction, and the unit of the first measurement signal uM of the microactuator is the volt.

With the reference signal r set to zero, the position error signal e is input to the positioning controller CV via a terminal 31. When output of the positioning controller CV is input to the VCM PV, the VCM PV inputs the VCM position signal yV to a terminal 32. On the other hand, when the first measurement signal uM of the microactuator PM is input to the microactuator PM, the microactuator PM inputs the displacement yM of the microactuator PM to the terminal 32. From the terminal 32, the head position signal y is input to the terminal 31.

A gain G1 of a transfer function (hereinafter, referred to as a "first transfer function") from the first measurement signal uM of the microactuator PM to the head position signal y shown in FIG. 2 can be obtained from an equation (1) below.

$$\text{Gain } G1 = \left| \frac{P_M}{1 + P_V C_V} \right| \quad (1)$$

Figure 3:
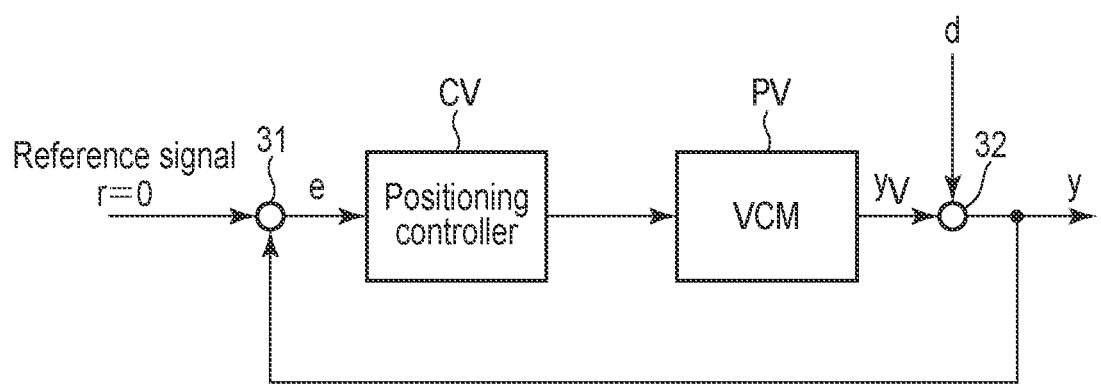
FIG. 3 is a diagram for explaining a measurement process of a second transfer function according to the embodiment.

FIG. 3 is a diagram for explaining a measurement process of a transfer function performed when a second measurement signal is input without actuating the microactuator PM. In FIG. 3, y denotes a head position signal, yV denotes a VCM position signal, e denotes a position error signal, and r denotes a reference signal as in the case of FIG. 2. Further, d denotes a second measurement signal, and the unit of d is a track or a distance in a radial direction.

With the reference signal r set to zero, the position error signal e is input to the positioning controller CV from the terminal 31. When output of the positioning controller CV is input to the VCM PV, the VCM PV outputs the VCM position signal yV to the terminal 32. On the other hand, the second measurement signal d is input to the terminal 32. From the terminal 32, the head position signal y is input to the terminal 31.

A gain G2 of a transfer function (hereinafter, referred to as a "second transfer function") from the second measurement signal d to the head position signal y shown in FIG. 3 can be obtained from an equation (2) below.

$$\text{Gain } G2 = \left| \frac{1}{1 + P_V C_V} \right| \quad (2)$$

Here, a gain (also referred to as an "MA gain") of the microactuator PM can be obtained by dividing the already described equation (1) by the equation (2), specifically from an equation (3) below.

$$MA \text{ Gain} = \left| \frac{P_M}{1 + P_V C_V} \right| \Big/ \left| \frac{1}{1 + P_V C_V} \right| \quad (3)$$

Figure 4:
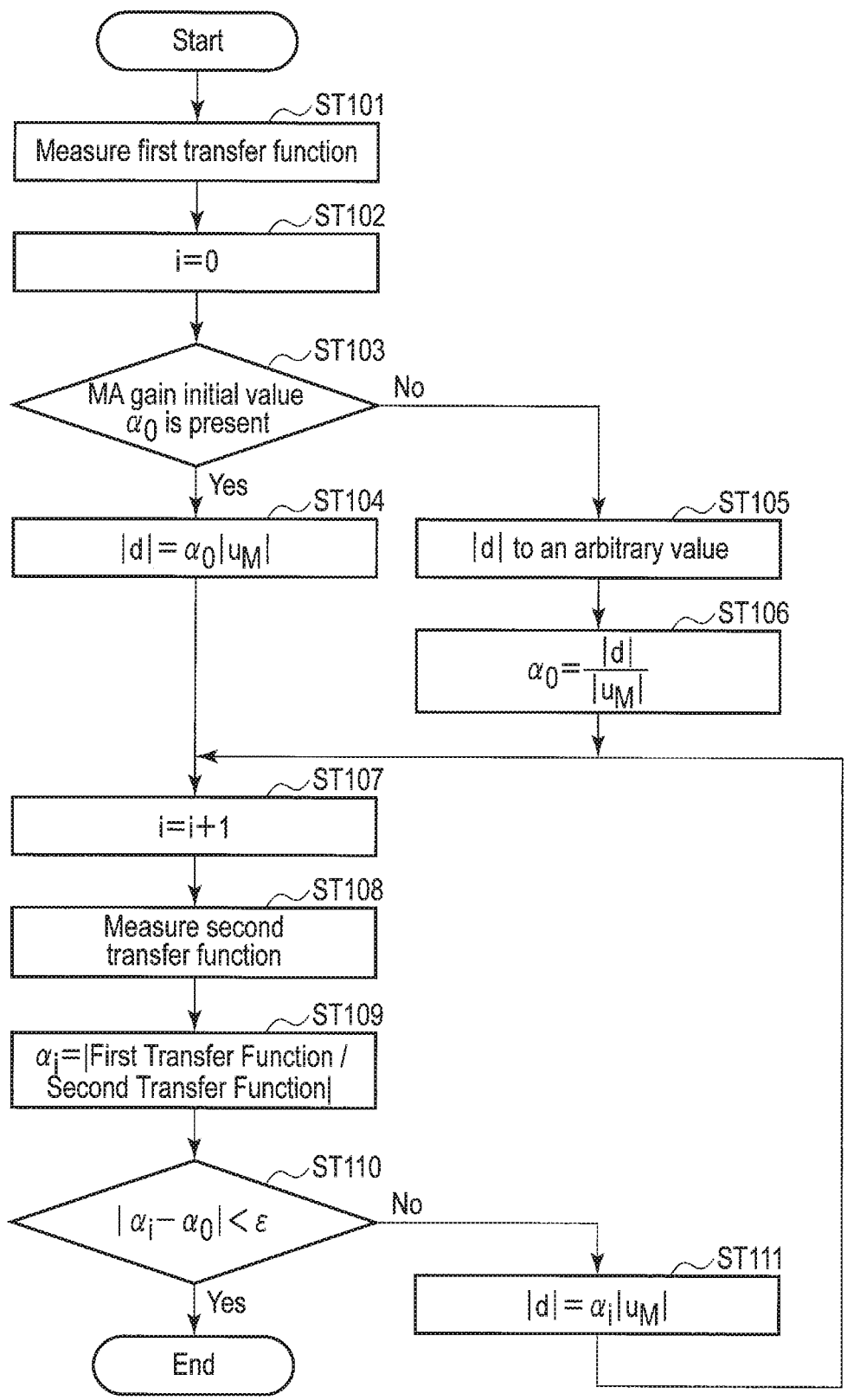
FIG. 4 is a flowchart showing an example of a gain estimation process according to the embodiment.

FIG. 4 is a flowchart showing an example of a gain estimation process by which the MA gain is estimated. The gain estimation process is executed, for example, at each predetermined timing after the magnetic disk device is installed in a computer, etc. The predetermined timing is, in the present embodiment, every time when a predetermined period has passed. In addition, the gain estimation process of the MA gain may be executed, not every time when a predetermined period has passed, but at an optional timing or a timing when a predetermined event has occurred. That is, the timing of the execution of the gain estimation process can be optionally set. Moreover, if the magnetic disk device 1 includes a plurality of magnetic heads 15, the gain estimation process is executed for each magnetic head 15.

As already described with reference to FIG. 2, the CPU 21 measures a first transfer function (ST101). A first gain thereby can be obtained from the already described equation (1). Next, the CPU 21 sets a variable i to zero (ST102). Then, the CPU 21 determines whether an MA gain initial value $\alpha_0$, which is an initial value of the gain (MA gain) of the microactuator PM, is present or not (ST103). Here, as the MA gain initial value $\alpha_0$, a design value or an average value of measured values acquired from magnetic disk devices of the same type is adopted. In addition, whether the MA gain initial value $\alpha_0$ is present or not is determined, for example, on the basis of whether data of the MA gain initial value $\alpha_0$ is stored in a predetermined area of the memory 24 or not.

If it is determined that the MA gain initial value $\alpha_0$ of the gain of the microactuator PM is present (ST103: YES), the CPU 21 sets a second measurement signal amplitude |d| to $\alpha_0$|uM| (ST104). In contrast, if it is determined that the MA gain initial value $\alpha_0$ of the microactuator PM is not present (ST103: NO), the CPU 21 sets the second measurement signal amplitude |d| to an arbitrary value (ST105). Also, the MA gain initial value $\alpha_0$ at this time can be obtained from |d|/|uM| (ST106).

When the MA gain initial value $\alpha_0$ of the microactuator PM is set in the above-described manner, the CPU 21 then adds one to the variable i (ST107), and measures a second transfer function (ST108). A second gain thereby can be obtained from the already described equation (2). Next, the CPU 21 obtains an MA gain estimated value $\alpha_i$ of the microactuator PM from the already described equation (3), that is, by dividing |First Transfer Function| by |Second Transfer Function| (ST109). In other words, the MA gain estimated value $\alpha_i$ is obtained by dividing the gain G1 by the gain G2.

Next, the CPU 21 determines whether $|\alpha_i - \alpha_0|$ is less than a predetermined value ε or not (ST110).

Here, the predetermined value ε is a sufficiently small optional value. If it is determined that $|\alpha_i - \alpha_0|$ is not less than the predetermined value ε (ST110: NO), the CPU 21 sets the second measurement signal amplitude |d| to $\alpha_i$|uM| (ST111). Then, the process returns to step ST107. The process from step ST107 to step ST110 is thereby executed. By repeating the process in this manner, the MA gain estimated value $\alpha_i$, which is less than the predetermined value ε and appropriate, can be obtained. Then, if it is determined that $|\alpha_i - \alpha_0|$ is less than the predetermined value ε (ST110: YES), since the appropriate MA gain is obtained, the CPU 21 ends the process.

The first measurement signal uM of the microactuator PM applied when the first transfer function is measured, that is, the amplitude, depends on the input voltage of the microactuator PM applied when the microactuator PM is actually actuated. Thus, the second measurement signal amplitude |d| is obtained by the process of FIG. 4 in accordance with the amplitude of the microactuator PM. In this manner, by substantially equalizing the amplitude of the second measurement signal d and the displacement yM of the microactuator PM at the time when the gain of the microactuator PM is measured, a measurement error due to an excitation amplitude at the time when a transfer function is measured can be reduced. Also, if the gain of the microactuator PM is estimated at a plurality of frequencies, it suffices that MA gain estimation process of the microactuator PM be executed for each of the frequencies.

FIG. 5 is a diagram showing an example of a process result (history information) T of the estimation process of the MA gain. As already described, the process result T is, for example, stored in a predetermined area in the memory 24.

As shown in FIG. 5, in the process result T, a time and date is associated with a value (for example, X11, X12, . . . , X1N) of $\alpha_i$ at a position (position A, position B, . . . , position N), which is each track or a distance in a radial direction of the magnetic disk 11 at the time when the estimation process of the MA gain is executed at the time and date.

Further, on the basis of an instruction from outside the magnetic disk device 1, for example, from a host system (not shown in the figures), the process result T can be output to the host system. That is, if the CPU 21 receives an instruction to output the process result T from the host system, the CPU 21 reads the process result T stored in the memory 24, and outputs the process result T to the host system via the disk controller 23. A user operating the host system thereby can ascertain the process result T obtained by executing the estimation process of the gain of the microactuator PM.

Furthermore, while the magnetic disk device 1 in which the process result T shown in FIG. 5 is stored in the memory 24 has been described in the present embodiment, the process result T may not be stored in the memory 24 as a history.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first actuator which actuates a magnetic head portion including a magnetic head;
a second actuator which adjusts a position of the magnetic head on a magnetic disk in a radial direction of the magnetic disk; and
a control portion which determines a second measurement signal amplitude when a second transfer function is measured in accordance with a first gain estimated value of the second actuator and a first measurement signal to the second actuator applied when a first transfer function is measured, which calculates a second gain estimated value of the second actuator based on the first transfer function and the second transfer function, and which updates the first gain estimated value, using the calculated second gain estimated value.

2. The magnetic disk device of claim 1, comprising a memory in which history information of the first gain estimated value updated at a predetermined timing is stored.

3. The magnetic disk device of claim 2, wherein the history information of the first gain estimated value stored in the memory is able to be output based on an instruction from outside.

4. The magnetic disk device of claim 1, wherein the second measurement signal amplitude when the second transfer function is measured is a product of the gain estimated value of the second actuator and the amplitude of the first measurement signal to the second actuator applied when the first transfer function is measured.

5. The magnetic disk device of claim 1, wherein an initial value of the first gain estimated value is a predetermined design value or an average value of predetermined measured values.

6. The magnetic disk device of claim 1, wherein an initial value of the first gain estimated value is a value based on a gain of the second transfer function measured using an arbitrary amplitude of a second measurement signal.

7. The magnetic disk device of claim 1, wherein the control portion executes a process of updating the first gain estimated value until the first gain estimated value of the second actuator calculated based on the first transfer function and the second transfer function converges to a predetermined value.

* * * * *